United States Patent
Pastor Nigorra et al.

(10) Patent No.: US 11,563,224 B2
(45) Date of Patent: Jan. 24, 2023

(54) METHOD FOR START PREPARATION

(71) Applicant: Cellcentric GMBH & CO. KG, Kirchheim unter Teck (DE)

(72) Inventors: Pere Antoni Pastor Nigorra, Tuebingen (DE); Sven Schmalzriedt, Esslingen (DE); Hans-Joerg Heidrich, Ulm (DE)

(73) Assignee: Cellcentric GmbH & Co. KG, Kirchheim unter Teck (DE)

(*) Notice: Subject to any disclaimer, the term of this patent is extended or adjusted under 35 U.S.C. 154(b) by 0 days.

(21) Appl. No.: 17/269,753

(22) PCT Filed: Aug. 14, 2019

(86) PCT No.: PCT/EP2019/071795
§ 371 (c)(1),
(2) Date: Feb. 19, 2021

(87) PCT Pub. No.: WO2020/038792
PCT Pub. Date: Feb. 27, 2020

(65) Prior Publication Data
US 2021/0242477 A1   Aug. 5, 2021

(30) Foreign Application Priority Data

Aug. 21, 2018 (DE) .................... 10 2018 006 624.0

(51) Int. Cl.
*H01M 8/04223* (2016.01)
*H01M 8/04302* (2016.01)
(Continued)

(52) U.S. Cl.
CPC ... *H01M 8/04253* (2013.01); *H01M 8/04302* (2016.02); *H01M 8/04723* (2013.01);
(Continued)

(58) Field of Classification Search
CPC ......... H01M 8/04253; H01M 8/04302; H01M 8/04723; H01M 8/0432; H01M 8/04358;
(Continued)

(56) References Cited

U.S. PATENT DOCUMENTS

2004/0197610 A1* 10/2004 Drunert ............. H01M 8/04302
429/423
2004/0229097 A1   11/2004 Hirakata et al.
(Continued)

FOREIGN PATENT DOCUMENTS

DE   10 2004 024 117 A1   12/2004
DE   10 2012 023 799 A1   6/2014
(Continued)

OTHER PUBLICATIONS

PCT/EP2019/071795, International Search Report dated Dec. 4, 2019 (Two (2) pages).

*Primary Examiner* — Ula C Ruddock
*Assistant Examiner* — Matthew W Van Oudenaren
(74) *Attorney, Agent, or Firm* — Sheridan Ross P.C.

(57) ABSTRACT

A method for preparing a fuel cell system in a vehicle for starting, for which purpose a starting preparation routine is carried out after the vehicle has been shut down depending on a temperature limit value. In the method, in the event that the fuel cell had not reached its normal operating temperature during the previous operation and a temperature falls below the predetermined temperature limit value, the fuel cell system is operated until it has reached its normal operating temperature and after which the starting preparation routine is subsequently carried out.

5 Claims, 1 Drawing Sheet

(51) Int. Cl.
*H01M 8/04701* (2016.01)
*H01M 8/04303* (2016.01)
*H01M 8/0432* (2016.01)

(52) U.S. Cl.
CPC ...... *H01M 8/0432* (2013.01); *H01M 8/04303* (2016.02); *H01M 8/04358* (2013.01); *H01M 2250/20* (2013.01)

(58) Field of Classification Search
CPC ......... H01M 8/04303; H01M 8/04223; H01M 8/04225; H01M 8/04228; H01M 8/04268; H01M 8/04365; H01M 2250/20; H01M 8/04731
See application file for complete search history.

(56) References Cited

U.S. PATENT DOCUMENTS

2006/0183005 A1* 8/2006 Yip ..................... H01M 8/0435
429/514
2010/0112389 A1* 5/2010 Miyata ................... B60L 50/72
429/429

FOREIGN PATENT DOCUMENTS

| DE | 10 2013 017 543 A1 | 4/2015 |
| DE | 10 2016 116 214 A1 | 3/2018 |

* cited by examiner

METHOD FOR START PREPARATION

CROSS REFERENCE TO RELATED APPLICATIONS

This application is a national stage application under 35 U.S.C. 371 and claims the benefit of PCT Application No. PCT/EP2019/071795 having an international filing date of 14 Aug. 2019, which designated the United States, which PCT application claimed the benefit of German Application No. 102018006624.0 filed 21 Aug. 2018, the disclosures of which are incorporated herein by reference in their entireties.

BACKGROUND AND SUMMARY OF THE INVENTION

The invention relates to a method for preparing a fuel cell system in a vehicle for starting, according to the type defined in more detail herein.

Fuel cell systems are known from the general prior art. They can be used, for example, in vehicles to provide electrical drive power. One of the problems of fuel cell systems lies in the formation of very pure water in the fuel cell system during operation. If temperatures fall below freezing point, which is unavoidable in vehicle applications in particular, the fuel cell system can freeze and cause problems when it is restarted, or it takes a very long time to start the fuel cell system. This is due to the fact that condensed and frozen moisture can block gas duct channels and/or valves, for example, and other components can be impaired in their function by the formation of ice.

To counteract this problem, it is known from the general prior art that in order to prepare a fuel cell system for a starting process, a starting preparation routine is performed when the fuel cell system is shut down in order to remove water and moisture from the fuel cell system. Typically, this involves flushing the fuel cell system with gas, which is conveyed, for example, by the air conveying device and/or a hydrogen recirculation blower or other type of blower. This blows moisture out of the fuel cell system, and any water separators and the like can be emptied and flushed in order to discharge as much moisture as possible here as well. Now, fuel cell systems are typically still very warm during shutdown and the subsequent switching off process, such that vapor may remain in the fuel cell system, which later condenses out and, if the temperatures then fall below freezing, can also lead to the problems described above.

In the further general prior art, it is therefore also known, as a supplement or alternative to the starting preparation routine described above, to perform a starting preparation routine when the fuel cell system is at a standstill. For this purpose, the fuel cell system is woken, for example, when the ambient temperature drops below a predefined limit value, in order to then perform the starting preparation routine and dry the system. In contrast to drying immediately after shutting down the fuel cell system, this starting preparation routine, which is often also referred to as conditioning or shutdown conditioning, has the advantage that condensed water can also be removed later. For this reason, it is also quite sensible to carry out both routines. Purely by way of example, reference can be made in this connection to DE 10 2016 116 214 A1.

DE 10 2013 017 543 A1 describes the classification of the load condition before shutting down the fuel cell system into different classes and then determines the time for the start-up preparation routine on the basis of these classes, such that, for example, in the case of very humid operation, drying is even stronger than in the case of less humid operation. All in all, this is still relatively complex.

Furthermore, a method is known from DE 10 2012 023 799 A1, in which the fuel cell system is not dried by means of flushing with air but primarily by negative pressure. This is also one of several possibilities known from the prior art.

The object of the present invention is now to specify an improved method for preparing a fuel cell system for starting in a vehicle, which ensures sufficient drying of the fuel cell system in every case.

In the starting preparation method according to the invention, in the event that the fuel cell had not reached its normal working temperature during a previous operation, and a current temperature falls below the predetermined temperature limit, the fuel cell system is first operated until it reaches its normal working temperature, wherein the starting preparation routine is subsequently performed. Thus, the method according to the invention simply requests temperatures, which is exceptionally simple and can be done very reliably with simple, robust and inexpensive sensors. In the event that the fuel cell system had reached its normal working temperature during operation, a conventional starting preparation method is started when a limit temperature is reached, as is known from the prior art. If the fuel cell system in the vehicle has not reached its normal operating temperature, either because it has only been moved over a short distance or because the ambient temperature was extremely low, then the fuel cell system is started first when the limit temperature is reached. It is then operated until it reaches its normal working temperature. This automatic operation of the fuel cell system when the vehicle is actually at a standstill then ensures that when the normal working temperature of the fuel cell system is reached, it is switched off from defined conditions without the need for complex sensor technology to record operating conditions such as humidity and the like. Subsequently, the starting preparation routine is then carried out starting from the renewed shutdown of the fuel cell system in this automatic operation, which has brought about the normal temperature of the fuel cell system.

A particularly favorable development of the idea is that the starting preparation routine takes place after the fuel cell system has cooled down again to the temperature limit value. This ensures that shutting down the fuel cell system after the normal operating temperature has been reached and the method according to the invention are practically identical in terms of the operating characteristics of the fuel cell system and the starting preparation routine, such that only a single procedure needs to be kept in place, and no complex sensor system with complex programmable values to be recorded, such as humidity, is required. Instead, simple and robust temperature sensors are sufficient to perform the starting preparation routine and, if required, the method according to the invention if the fuel cell system had not reached the normal working temperature in the previous operation.

The normal working temperature can be predetermined at values between, for example 60° C. and 70° C., preferably about 65° C., which corresponds to a usual working temperature for PEM fuel cells. The temperature limit value can be specified at, for example, about 5° C. to 10° C., preferably about 5° C. At such a temperature of about 5° C., which is measured inside the fuel cell system, and here preferably in the area of the stack, it can be assumed that the temperature will drop even further if necessary and that temperatures below freezing point will occur. The execution of a starting preparation routine from such a limit temperature of 5° C. is therefore reasonably efficient, on the one hand to cover all cases in which a potential freezing of the fuel cell system is imminent and, on the other hand, in those cases in which higher outside temperatures are present, to precisely avoid this energetic expenditure.

The starting preparation routine itself can be carried out, for example, in one of the ways known from the prior art, for example by flushing the fuel cell system with air and/or hydrogen, drying the fuel cell system by heating and/or negative pressure, or in similar known ways.

Further advantageous designs of the method according to the invention also become clear with reference to the exemplary embodiment, which is described in more detail below with reference to the figures.

DETAILED DESCRIPTION OF THE DRAWINGS

Figure 1:
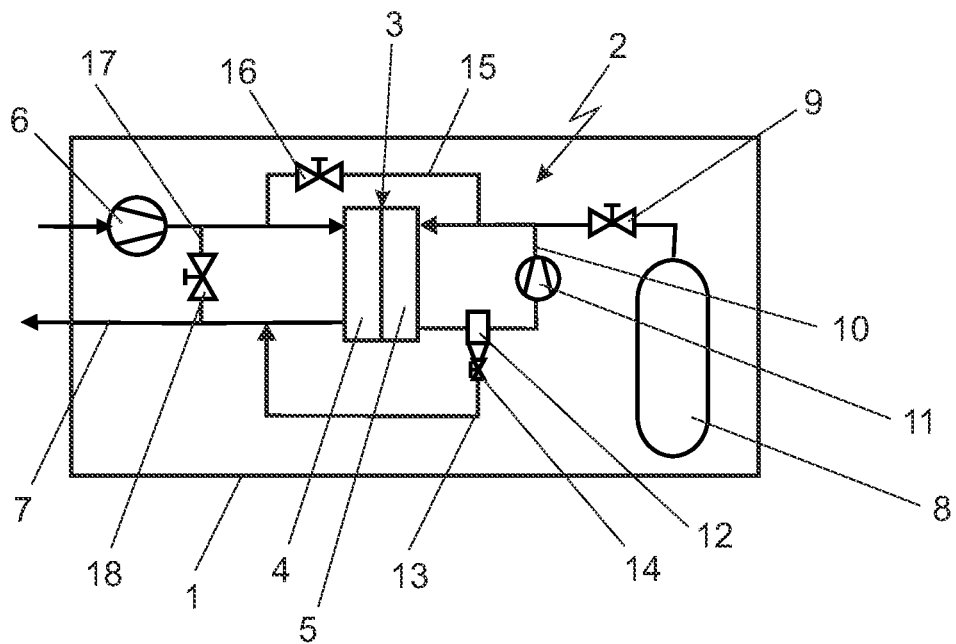
FIG. 1 illustrates a vehicle with a fuel cell system suitable for carrying out the method according to the invention.

In the depiction in FIG. 1, a vehicle 1 is indicated in a highly schematic way. The vehicle 1 can, for example, be designed as a passenger car, a lorry, a rail-bound vehicle or an industrial vehicle for logistics purposes. The vehicle 1 could just as easily be used, for example, as a ship or an aircraft. In the vehicle 1, there is a fuel cell system 2 indicated in principle, the core of which is a fuel cell 3. This fuel cell 3 is to be constructed as a stack of PEM single cells, a so-called fuel cell pile or fuel cell stack. Symbolically, a cathode compartment 4 and an anode compartment 5 are indicated within the fuel cell 3. For regular operation, air is supplied to the cathode compartment 4 via an air conveyor 6 as an oxygen supplier. Exhaust air exits the fuel cell system 2 via an exhaust line 7. Hydrogen is supplied to the anode compartment 5 of the fuel cell 3 from a compressed gas storage unit 8 via a pressure control and metering unit 9. Unused hydrogen as well as inert gases and water which are produced in the area of the anode compartment 5 are returned via a recirculation line 10 and can be fed back to the anode compartment 5 mixed with fresh hydrogen. A recirculation conveyor 11 is arranged in the recirculation line 10, which in the exemplary embodiment depicted here is designed as a hydrogen recirculation blower (HRB). The recirculation conveyor 11 could just as well be implemented as a gas jet pump or as a combination of a gas jet pump and a blower. In addition, a water separator 12 is located in the recirculation line 10, which is connected to the exhaust air line 7 from the fuel cell system 2 via a drain line 13 with a valve device 14. Water can thus be collected via the water separator 12 and the valve device 14 and discharged from time to time, for example. It is just as well conceivable to drain the water depending on a filling level in the water separator or depending on concentrations in the so-called anode circuit. Together with the water, gas can also be discharged, since inert gas, which has diffused through the membranes of the fuel cell 3 from the cathode compartment 4 into the anode compartment 5, accumulates in the anode circuit over time. Since this would reduce the hydrogen concentration in the anode circuit, which is constant in its volume, this gas must also be discharged. This can be done via a separate line or together with the water via the drain line 13 and the valve device 14.

In the depiction of FIG. 1, a connecting line 15 with a valve device 16 can now also be seen, which connects the anode circuit with an air supply line 17 to the cathode compartment 4 of the fuel cell 3. A connection between the cathode side and the anode side of the fuel cell system 2 can thus be created via the connecting line 15 when the valve device 16 is open. Depending on the arrangement and design, the connecting line 15 can also be used, for example, to discharge the gas in parallel with the discharge of water via the water separator 12 and the discharge line 13, in which case the branching point would typically be arranged between the water separator 12 and the recirculation feed device 11. The introduction of the discharged gas into the supply air line 17 is generally known and customary in this case, since in this way any hydrogen, which is typically always discharged along with it in small quantities, reacts on the catalyst of the cathode chamber 4, and hydrogen emissions to the environment can thus be avoided.

The connecting line 15 with the valve device 16 can also be omitted in the event that the side of the anode compartment 5 is flushed with hydrogen during drying, which is then appropriately diluted by means of the air conveyed through the cathode compartment 4 when it is discharged into the environment via the exhaust line 7.

The fuel cell system 2 in the vehicle 1 may further comprise a so-called system bypass 17, which makes it possible to connect the pressure side of the air conveying device 6 and the exhaust air line 7 via a bypass valve 8. In addition, an exhaust air turbine (not shown here) may be arranged in the exhaust air line 7, which may be mechanically connected to the air conveying device 6 and preferably to an electric machine as a motor/generator or only to a generator and via the latter electrically to a motor for the air conveying device 7. Such a structure is also known from the general prior art and is referred to as an electric turbocharger or motor-assisted turbocharger.

A starting preparation routine is now carried out in a manner known per se by means of flushing the system and/or drying the system by heating and/or negative pressure as soon as the temperatures, for example the temperature in the environment or in particular the temperature in the fuel cell system, and very preferably in the region of the fuel cell stack, i.e., the fuel cell 3, fall below a predetermined temperature limit value of, for example, 5° C.

Figure 2:
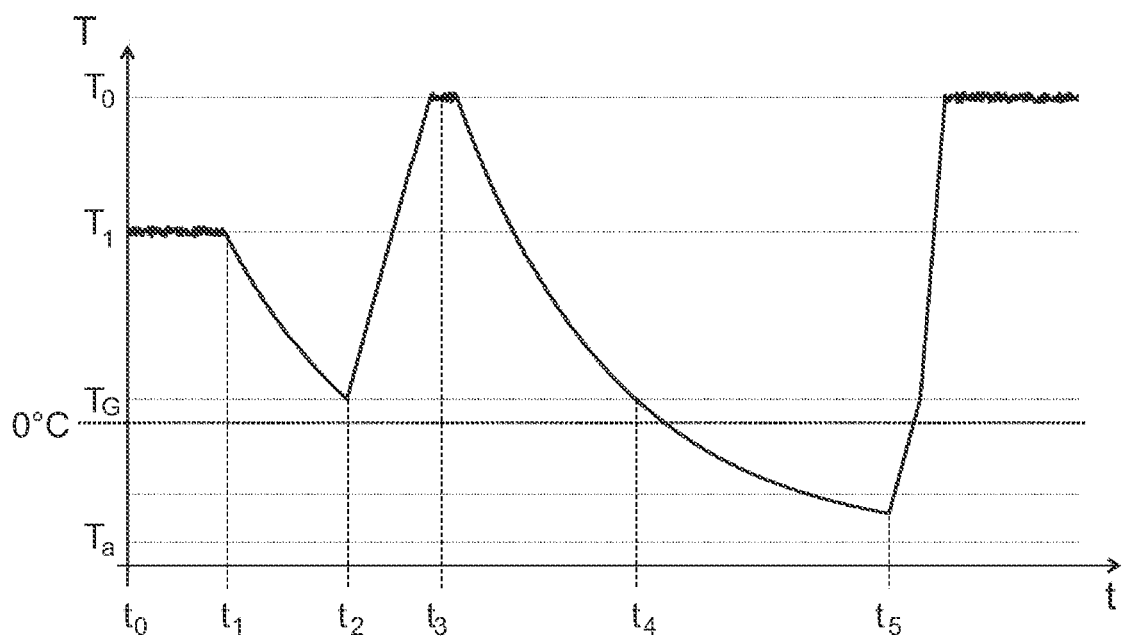
FIG. 2 is a diagram describing the method according to the invention on the basis of a temperature curve T over time t.

In order to ensure that sufficient drying always takes place with a standardized starting preparation routine, which is largely independent of any input parameters and is therefore simpler than in the prior art, the following procedure is now followed. The process sequence can be seen in particular in FIG. 2 in the graph of temperature T versus time t. The first section between the point in time $t_0$ and the point in time $t_1$ describes a normal operation in which the operating temperature T, which can preferably be measured in a cooling water circuit of the fuel cell system 2, since temperature sensors are installed there anyway, fluctuates around an average value $T_1$. The temperature value should, for example, be below the usually occurring temperature value $T_0$, which occurs during normal operation of the fuel cell system 2 or of the vehicle 1, during a short-distance trip. It may be 40% for example. At the point in time $t_1$, driving operation is ended and the system is shut down. It then cools down to a limit temperature $T_G$, which is minimally above the freezing point of water, which is drawn here with a 0° C. line. If this temperature limit $T_G$ is reached during the course of the temperature T, in this case at the point in time $t_2$, then a starting preparation routine is usually triggered in order to dry out the fuel cell system 2, because when the limit temperature $T_G$ is reached it must be assumed that the temperature will drop further and, in particular, will fall below the freezing point of 0° C. However, if the previous operation of the fuel cell system 2 was such that the normal operating temperature $T_0$ was not reached at all, then no starting preparation routine is triggered at the point in time $T_2$, but the fuel cell system 2 is started up while the vehicle 1 is stationary. Accordingly, it heats up during this automated operation starting from the limit temperature $T_G$. It is operated in such a way that it reaches the normal operating temperature $T_0$ of, for example, 65° C. for a certain time during the operating phase at the point in time $t_3$. After this, the automatically started fuel cell system 2 is automatically stopped again, and cooling starts anew. At the point in time $t_4$, the limit temperature $T_G$ of, for example, 5° C. is reached again. Now, however, cooling takes place as usual from the normal temperature level $T_0$ of the fuel cell system 2. At the point in time $t_4$, therefore, a system preparation routine starts which dries the fuel cell system 2 accordingly, in particular by one or more of the measures already described above and known from the prior art.

In the exemplary embodiment shown here, the temperature then drops even further, in particular to a temperature well below the freezing point at the point in time $t_5$, which is only minimally above the ambient temperature $T_a$, which is also very low here. At the point in time $t_5$, a freeze starting routine is then initiated to start the fuel cell system 2, in the course of which the temperature T rises relatively quickly back to the normal operating temperature $T_0$ and the fuel cell system is ready for operation. This is possible without any problems due to the starting preparation routine started at the point in time $t_4$, which has dried out the fuel cell system 2, since blockages due to ice can be efficiently prevented due to the procedure described.

The invention claimed is:

1. A method for preparing a fuel cell system in a vehicle for starting, comprising the steps of:
   when the fuel cell system did not reach a normal operating temperature of the fuel cell system during a previous operation and a current temperature falls below a predetermined temperature limit value,
   operating the fuel cell system until the fuel cell system reaches the normal operating temperature and
   subsequently performing a starting preparation routine, wherein the starting preparation routine comprises drying the fuel cell system,
   wherein the starting preparation routine is performed only after the fuel cell system has cooled down to the predetermined temperature limit value after reaching the normal operating temperature.

2. The method according to claim 1, wherein the normal operating temperature is 60° C. to 70° C.

3. The method according to claim 1, wherein the predetermined temperature limit value is a value within a range of 0° C. to 10° C.

4. The method according to claim 1, wherein the current temperature is measured in an interior of the fuel cell system.

5. The method according to claim 4, wherein the current temperature is measured in a region of a fuel cell of the fuel cell system and/or in a region of a coolant for the fuel cell.

\* \* \* \* \*